Substitute for Drawing Lost.

R. MONTGOMERY & L. W. HARRIS.

Breaking and Grinding Bark.

No. 1,714. Patented Aug. 12, 1840.

Witnesses. Inventor.

UNITED STATES PATENT OFFICE.

RICHARD MONTGOMERY AND LEWIS W. HARRIS, OF SANGERFIELD, NEW YORK.

MILL FOR BREAKING AND GRINDING BARK.

Specification of Letters Patent No. 1,714, dated August 12, 1840.

*To all whom it may concern:*

Be it known that we, RICHARD MONTGOMERY and LEWIS W. HARRIS, of Sangerfield, in the county of Oneida and State of New York, have invented a new Mode of Breaking and Grinding Bark and other Substances of a Similar Character; and we do hereby declare that the following is a full and exact description thereof.

The nature of our invention consists in providing a mode of breaking and grinding bark and other substances of a like character by means of hollow stationary cylinders and one or more revolving conical nuts placed concentrically in connection with teeth and pickers the whole constructed arranged and combined as hereinafter particularly described, the machine operating with the like facility and with the same effect whether its revolutions are performed forward or in a counter direction.

To enable others skilled in the art to which our invention appertains or with which it is most nearly connected to make and use such invention we will proceed to describe its construction and operation.

The material parts of our machine are as follows viz:

First. A cylinder D, (Fig. 1,) which is hollow, the sides within and without are perpendicular to the base the interior surface being provided with teeth. This cylinder is stationary.

Second. Another cylinder M, (Fig. 1,) which is also hollow. Its sides like those in the cylinder D, (Fig. 1,) are also perpendicular to the base within and without, and are provided with teeth. This cylinder is also stationary.

Third. A conical nut, b, (Fig. 2,) which is hollow. The sides within and without incline upwards each toward the other at a corresponding angle. The sides within and without are provided with teeth.

Fourth. Another conical nut T, (Fig. 2,) which is solid and through the center and axis of which a shaft passes. The exterior surface of this nut inclines equally on all sides upward toward the shaft (a) (Fig. 2) and is provided with teeth. The nuts, b, and T revolve with the shaft (a) to which they are attached.

Figure 1:
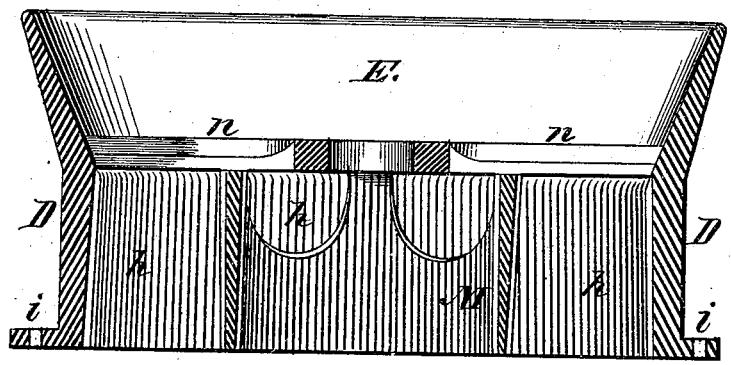
Figure 2:
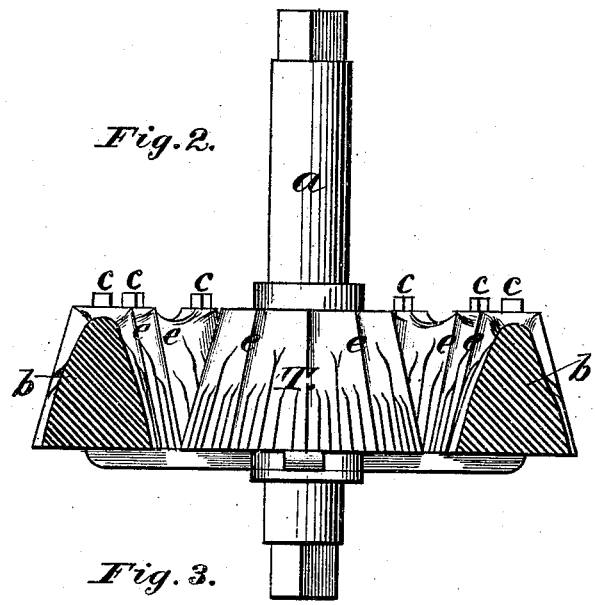

Fifth. Fluted teeth, h, h, h, (Figs. 1 and 2,) upon the internal surface of the stationary cylinder D, (Fig. 1,) and upon the internal and external surfaces of the stationary cylinder M, (Fig. 1,) and upon the external and internal surface of the revolving nut, b, (Fig. 2,) and upon the external surface of the revolving nut T (Fig. 2.)

Sixth. Larger teeth c, c, c, c, (Fig. 2,) upon the external and internal surface of the revolving nut, b, (Fig. 2,) and upon the external surface of the revolving nut T, (Fig. 2.)

Seventh. Square teeth c, c, c, c, (Fig. 2,) with a flat top called pickers standing upon the upper end of the large teeth on the revolving nut (b), (Fig. 2.)

Eighth. Stationary transverse arms n, n, n, (Fig. 1,) to which the cylinders D and M, (Fig. 1,) are attached and which hold these cylinders in their proper position.

Ninth. Transverse arms to which the revolving nuts b and T, (Fig. 2,) are attached and which secure to these nuts a corresponding motion.

Tenth. The shaft, a, (Fig. 2,) which passes through the center and axis of the revolving nut T (Fig. 2,) and to which it is secured.

Eleventh. A hopper, e, (Fig. 1,) for holding the substance to be ground and which is attached to the outside cylinder D, (Fig. 1.)

Figure 3:

Twelfth. A cross bar, f, (Fig. 3,) with a socket (u) in its center in which the end of the shaft a, (Fig. 2) turns.

Thirteenth. Ears i, i, i, i, (Fig. 1) upon the cylinder D, (Fig. 1,) through which bolts or screws are passed to secure the machine in a fixed and permanent position.

The drawings which accompanying this specification represent different parts of our machine, and the proper position in the machine of the several parts represented will appear from the description and references.

The stationary cylinders D and M, (Fig. 1,) are provided with low fluted teeth of equal length depth and size, extending longitudinally along and entirely across, the inner surface of the cylinder D, and the outer and inner surfaces of the cylinder M, and disposed at equal distances entirely around them. They are arranged in perpendicular lines parallel to each other and to the upright shaft, a, (Fig. 2,) and are formed and separated by a narrow concave groove extending the entire length of each tooth and on both sides of it.

The revolving nut T, (Fig. 2) which is attached to the shaft, a, (Fig. 2,) is in the form of a truncated cone its sides retreating upward toward the shaft (*a*). The form of the revolving nut, *b*, (Fig. 2) is that of a hollow truncated cone retreating without on all sides alike upward toward the shaft, *a*. The interior surface of this nut and the teeth thereon converge on all sides from the top downward toward the lower end of the shaft (*a*,) at an angle corresponding with that of the shaft of the slope externally. The revolving nuts T and *b*, (Fig. 2,) are provided with low fluted teeth of an equal depth and size and differing from each other only in length. They are like the small teeth in the cylinders D, and M, (Fig. 1), and are situated upon the external side of the revolving nut T (Fig. 2,) and upon the external and internal sides of the revolving nut, *b*, (Fig. 2). They begin at the lower termination of the sides and extend longitudinally along but not entirely across them, and are formed and separated from each other by a concave groove in like manner with those in the cylinders D, and M, (Fig. 1,) above described and are disposed at equal distances from each other entirely around these sides. They are grooved out of the lower circular portion of the nuts longitudinally and as far as they extend slope with them. Those upon the external side of the revolving nut T (Fig. 2,) incline toward the upper portion of the shaft *a*, (Fig. 2,) and those upon the internal side of the nut *b*, (Fig. 2,) incline toward the lower end of this shaft. The revolving nuts T, and *b*, (Fig. 2,) are also each of them provided in addition to the small teeth above described with a row of larger teeth, arranged upon the external sides of the revolving nut, T, (Fig. 2,) and upon the external and internal sides of the revolving nut *b*, (Fig. 2,). Each tooth extends from the lower termination of these sides upward longitudinally entirely across to the upper termination thereof, and is a mere continuation of some of the small teeth above described extended and gradually increased in depth and size from the point of extension toward the top of the nuts respectively. The large teeth upon the nut, T, (Fig. 2,) and upon the external side of the nut, *b*, (Fig. 2,) incline with the surfaces upon which they are situated toward the shaft, *a*, (Fig. 2,) like the small teeth thereon and at a corresponding angle, while the large teeth upon the interior surface of the revolving nut, *b*, (Fig. 2,) incline like the small teeth upon this surface toward the lower portion of the shaft (*a*) and at the same angle with the small teeth last mentioned.

The back of each of the large teeth on the exterior surface of the revolving nut, *b*, (Fig. 2,) joins at the top of this nut with a large tooth of the same dimension on the interior surface of this nut the back coinciding and the edges facing in opposite directions. Upon the top of each of the large teeth thus united is a square tooth or picker standing parallel to the shaft (*a'*, Fig. 2,) which aids in breaking the bark or other substance to be ground against the stationary arms, *n, n, n*, (Fig. 1) as the nuts revolve.

The stationary arms *n* (Fig. 1) are attached to the cylinder *m*, at *n*, and to the cylinder D, at *o*. In the center of the arm N, at P, is a socket in which the shaft, *a*, (Fig. 2,) turns. The lower circumference of the hopper *e* (Fig. 1,) corresponds in size with the cylinder D, (Fig. 1) over which it is placed and to which it is permanently secured. Fig. 1 represents the stationary cylinders D and *m*, and the hopper, *e*, and the stationary arms, *n*, in an inverted position. R, (Fig. 1) is the space filled by the revolving nut, *b*, (Fig. 2); and S, (Fig. 1) that filled by the revolving nut T, (Fig. 2,) when placed in their proper positions in the machine. *g, g* (Fig. 1,) are ears upon the stationary cylinder D, to which the cross bar, *f*, (Fig. 3) is secured.

The nuts *b* and T, (Fig. 2) are firmly secured at the base to traverse arms which revolve with them. These revolving arms are like the stationary arms *n, n, n* (Fig. 1) and connect the nuts *b* and T with each other in the same manner that the stationary arms *n*, (Fig. 1,) connect the cylinders D and *m*, (Fig. 1). The lower end of the shaft, *a*, (Fig. 2) is firmly secured to the center of the revolving arms where these arms intersect each other. A revolution of the shaft therefore carries the revolving arms and the nuts *b* and T, around with it. *c, c, c, c*, (Fig. 2) are rows of pickers and large teeth upon the nuts *b* and T extending entirely around them. As the nuts revolve under the stationary arms, *n*, (Fig. 1) the bark or other substance to be ground is broken by them against the stationary arms and the surrounding teeth and sides of the cylinders D, and M, into pieces of a proper size to be acted on by the small teeth in the cylinders and nuts.

*h, h, h*, (Figs. 1 and 2,) are fine teeth upon the inner surface of the cylinder D, and upon the external and internal surfaces of the cylinder *m*, and upon the external and internal surfaces of the nut *b*, and upon the surface of the nut T. The nut, *b*, performs its revolutions between the cylinders D and *m*. The nut T, is surrounded by the cylinder *m*, within which it revolves. The small teeth in the cylinders are of a corresponding size with the small teeth in the nut opposed to them, and in connection with which they are designed to act. The teeth in the cylinders are perpendicular to the base of the cylinders, and surround the shaft, *a*, in lines parallel to the shaft and to each other. Those in the revolving nuts, surround the shaft, a, in lines inclining toward it as hereinbefore mentioned, but which are in the same plane with the axis of the shaft, a. The machine therefore grinds with the like facility, whether the nuts revolve forward or in a contrary direction.

The bark or other substance to be ground is placed in the hopper, e. The moving power is applied to the shaft, a, which in revolving takes with it the nuts, b, and T together with the arms which secure and connect them to each other. The substance is broken by the large teeth and pickers c, c, c, c, (Fig. 2,) against the stationary arms n, n, n, (Fig. 1) and the surrounding teeth and sides of the stationary cylinders and falling down between the small teeth in the cylinders and those in the nut opposite, is there ground and is then discharged through the small teeth, from the base of the machine. The revolving nuts being of a conical shape as above described, and the teeth thereon inclining with the cone upon which they are situated as above mentioned, may be brought nearer to those in the cylinders by raising the shaft, a, to which they are attached, or may be removed farther from them, by lowering the shaft, and in this manner the machine may be made to grind coarse or fine as occasion may require.

What we claim as our invention and desire to secure by Letters Patent is—

The combination of the conical nuts one or more with the cylinders placed concentrically as herein mentioned and described, and constructed arranged and connected in the manner herein described, and provided with teeth and pickers arranged as is also herein mentioned and set forth.

RICHARD MONTGOMERY.
LEWIS W. HARRIS.

Witnesses:
JULIUS CANDEE,
L. D. CARPENTER.